United States Patent [19]
Aoi et al.

[11] Patent Number: 5,441,848
[45] Date of Patent: Aug. 15, 1995

[54] OPTICAL RECORDING/REPRODUCING METHOD

[75] Inventors: Toshiki Aoi; Atsuko Motai; Akio Ogawa, all of Nagano, Japan

[73] Assignee: TDK Corporation, Tokyo, Japan

[21] Appl. No.: 226,358

[22] Filed: Apr. 12, 1994

[30] Foreign Application Priority Data

May 25, 1993 [JP] Japan .................. 5-145660

[51] Int. Cl.⁶ .................. G11B 7/00
[52] U.S. Cl. .................. 430/269; 430/21; 430/945
[58] Field of Search .................. 430/269, 21, 945, 495, 430/270, 275; 369/275.3, 277

[56] References Cited

U.S. PATENT DOCUMENTS

| | | | |
|---|---|---|---|
| 4,858,217 | 8/1989 | Fujiie et al. | 369/59 |
| 4,990,388 | 2/1991 | Hamada et al. | 428/64 |
| 5,075,147 | 12/1991 | Usami et al. | 428/64 |
| 5,080,946 | 1/1992 | Takagisi et al. | 428/64 |
| 5,154,958 | 10/1992 | Namba et al. | 428/64 |
| 5,155,723 | 10/1992 | Hamada et al. | 369/284 |
| 5,161,150 | 11/1992 | Namba et al. | 369/275.4 |
| 5,244,706 | 9/1993 | Hirata et al. | 428/64 |

FOREIGN PATENT DOCUMENTS

JP-B 75943 12/1991 Japan
5-314480 A 11/1993 Japan

OTHER PUBLICATIONS

Nikkei Electronics, Jan. 23, 1989 (No. 465) p. 107; CD-Compatible Write-Once Disc.

*Primary Examiner*—Charles L. Bowers, Jr.
*Assistant Examiner*—John A. McPherson
*Attorney, Agent, or Firm*—Watson Cole Grindle & Watson

[57] ABSTRACT

In an optical recording medium comprising an organic dye base recording layer and a reflective layer on a resin substrate having a groove of 1,100 to 2,300 Å deep formed in one surface thereof, signals are written by directing recording light to the recording layer within the groove from the back side of the substrate at a relative linear velocity of at least 3.6 m/s whereby record marks are formed in the recording layer as a result of partial decomposition of the dye while deforming the groove bottom surface. The deformation of the groove bottom surface is minimized to less than 18% of the groove depth. The medium requires a short time for recording and offers reduced jitter on reproduction.

4 Claims, 2 Drawing Sheets

OPTICAL RECORDING/REPRODUCING METHOD

BACKGROUND OF THE INVENTION

1. Field of the Invention

This invention relates to an optical recording medium, and more particularly, to an optical recording disk of the write-once type compatible with the compact disk and a method for recording and reproducing the medium.

2. Prior Art

Japanese Patent Publication (JP-B) No. 75943/1991 discloses an optical information recording medium capable of reproducing signals in accordance with the compact disk (often referred to as CD) standard. In the examples of this publication, an optical recording disk is fabricated by forming a light absorption layer containing an organic dye on a light transmissive resin substrate, forming a light reflection layer thereon with or without an intervening hard layer, and forming a resinous protective layer thereon. Signals are recorded in the optical recording disk by directing a laser beam of 6 mW to the light absorption layer at a relative linear velocity of 1.2 m/s and reproduction signals are read out in accordance with the CD standard. At spots where the laser beam is irradiated, the light transmissive resin substrate at the surface is deformed in a convex fashion to form pits which accompany a phase difference to enable reading of the recorded information.

A similar write-once type optical disk is described in Nikkei Electronics, Jan. 23, 1989, No. 465, page 107. This optical disk has on a polycarbonate substrate, a recording layer of organic dye, a reflective layer of gold, and a protective layer in the described order. Upon irradiation of a recording laser beam, the organic dye layer absorbs light and is melted or decomposed and the substrate is softened at the same time whereupon the dye and substrate components are mixed at the interface so that the interface is eventually deformed to form record pits. The thus formed pits afford low reflectivity due to an optical phase difference as found in the CDs.

As opposed to the advantage of CDs that since pits are formed at the same time as injection molding of substrates and are thus sufficiently precise in shape and size to minimize jitter, the above-mentioned optical recording disks often suffer from increased jitter because pits are formed by deformation of the substrate.

The optical recording disk of JP-B 75943/1991 has a further problem that recording requires the same length of time as reproduction because the linear velocity during recording is the same as that during reproduction.

SUMMARY OF THE INVENTION

Therefore, an object of the present invention is to provide an optical recording medium capable of reproduction in accordance with the CD standard and featuring minimized jitter and a short recording time.

The present invention pertains to an optical recording medium comprising a resin substrate having opposed face and back surfaces and a groove formed in the face surface, an organic dye-containing recording layer disposed on the face surface of the substrate directly or through another layer, and a reflective layer disposed on the recording layer directly or through an intermediate layer. According to the present invention, the groove in the substrate has a bottom surface and a depth from the substrate face surface to the bottom surface of 1,100 to 2,300 Å. For recording, recording light is directed to the recording layer within the groove from the back surface side of the substrate at a relative linear velocity of at least 3.6 m/s, thereby forming a record mark in the recording layer as a result of partial decomposition of the dye while deforming the groove bottom surface. The deformation of the groove bottom surface is limited within 18% of the groove depth.

According to another aspect of the present invention, there is provided a recording/reproducing method comprising the step of recording information in the optical recording medium defined above by directing recording light to the recording layer at a relative linear velocity Vw of at least 3.6 m/s.

Preferably, the recording light has a peak power of at least 10 mW as measured in the recording layer. Preferably, the recording light has been modulated with an EFM signal having a pulse width represented by $(n+p)T \cdot Vr/Vw$ wherein n is an integer of 3 to 11, factor p is in the range: $-0.7 \leq p \leq +0.2$, especially $-0.5 \leq p \leq +0.2$, $T = 231.4$ ns, Vr is a standard compact disk reproduction linear velocity in the range of 1.2 to 1.4 m/s, and Vw is a relative linear velocity of at least 3.6 m/s, especially, 4.8 to 5.6 m/s.

ADVANTAGES

In the present invention, recording light is irradiated to the recording layer within the groove of a specific depth at a relative linear velocity which is at least three times the standard reproduction linear velocity prescribed in the CD standard. At spots where the recording light is irradiated, the organic dye is partially decomposed to form a record mark and to deform the groove bottom surface. Because of a high linear velocity on writing, the deformation of the groove bottom surface at the irradiated spots is as small as 18% or less of the groove depth. This minimizes jitter. The high linear velocity used in recording means that the time taken for recording is significantly reduced.

Namba et al., U.S. Pat. No. 5,161,150 assigned to the same assignee as the present invention discloses an optical recording medium having a recording layer, a reflective layer, and a protective layer on a substrate. Recording light is directed to the recording layer in the groove to form pits. The groove bottom surface is kept flat or depressed in the pits. The relative linear velocity between recording light and the recording layer (or substrate) is 1.2 to 1.4 m/s which is identical with that of reproducing light. Then recording takes a relatively long time and a decomposed product which is insoluble in solvent will remain at the groove bottom in the record pits. The decomposed product assumes a complex shape and causes an increased quantity of deformation relative to the groove depth, resulting in increased jitter.

BRIEF DESCRIPTION OF THE DRAWINGS

The foregoing and other aspects, features and advantages of the invention are explained in the following description, taken in connection with the accompanying drawings where.

DESCRIPTION OF THE PREFERRED EMBODIMENTS

The optical recording medium of the invention is typically an optical recording disk having a dye base recording layer and a reflective layer and capable of reproduction in accordance with the CD standard.

Figure 1:
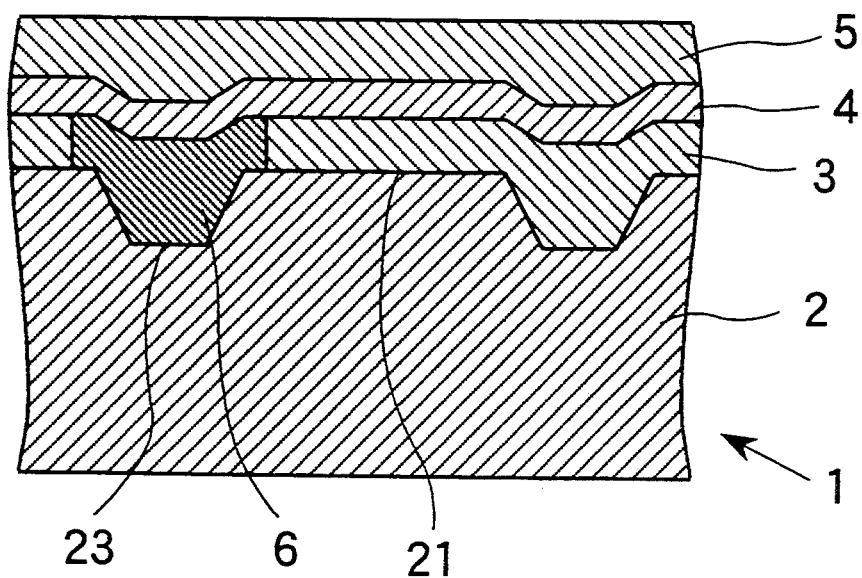
FIG. 1 is a fragmental cross-sectional view of an optical recording medium according to one embodiment of the present invention.

Referring to FIG. 1, there is schematically illustrated an optical recording medium according to one embodiment of the invention. The optical recording medium 1 includes a resin substrate 2 having face and back surfaces (upper and lower surfaces in the figure) and a groove 23 in the face surface (21). The optical recording medium 1 is shown in FIG. 1 as comprising an organic dye base recording layer 3 on the face surface of the grooved substrate 2, a reflective layer 4 disposed on the surface of the recording layer 3, and a protective layer 5 disposed on the surface of the reflective layer 4. Recording and reproducing light is directed to the recording layer 3 within the groove 23 from the back surface side of the substrate 2.

Substrate

The substrate 2 is often of conventional disk shape and has commonly used dimensions, for example, a thickness of about 1.2 mm and a diameter of about 80 to 120 mm when the disk is intended for a CD. The substrate 2 is made of a resin which is substantially transparent to recording and reproducing light, typically a semiconductor laser beam having a wavelength of 700 to 900 nm, especially 780 nm. The substrate material preferably has a transmittance of at least 80% so that recording and reading operation can be made through the substrate 2, that is, from the back surface of the substrate 2 remote from the recording layer 3. The substrate 2 may be made of any of conventional resins, typically thermoplastic resins such as polycarbonate resin, acrylic resins, amorphous polyolefins, and TPX.

On the face surface (the upper surface in the figure) of the substrate 2 where the recording layer 3 is formed, a groove 23 is formed in a predetermined pattern for tracking control and time information carrying purposes. The remaining face surface is designated a land 21. Differently stated, the adjoining groove turns 23 are separated by a land 21. The groove 23 has a bottom surface and a depth between the face surface or land 21 and the bottom surface. According to the invention, the groove depth is in the range of 1,100 to 2,300 Å, preferably 1,300 to 2,100 Å. A too shallow groove has the problem that the groove bottom surface and the reflective layer undergo excessive deformation relative to the groove depth and the relatively excessive deformation tends to induce distortion in the waveform of reproduced RF signals, resulting in increased jitter. Such a shallow groove also fails to provide sufficient signal modulation. A too deep groove has the problem of increased jitter since the groove bottom surface in the record mark undergoes inconsistent deformation. The wavelength dependency of reproduction and tracking signals is increased. It is difficult to form such a deep groove to a uniform configuration when the grooved substrate is formed by an injection molding method. The groove may be formed at the same time as the substrate is molded. Alternatively, a resin layer (not shown) having a predetermined pattern of groove may be formed on the substrate by 2P (photo-polymerization) method or the like. In addition to the groove, the substrate on the surface may be provided with a ROM region where pits are formed as in conventional CDs.

Recording layer

The recording layer 3 is formed on the grooved substrate 2 using a dye or a mixture of compatible dyes. Preferably the recording layer 3 has a coefficient of extinction (the imaginary part of a complex index of refraction) k of from 0.01 to 0.10 at the wavelength of recording and reading light. With a coefficient of extinction k of less than 0.01, the recording layer can have a lower absorptivity so that recording may required a greater power. A coefficient of extinction k of more than 0.10 can result in a drop of reflectivity to below 60%, often failing to allow reproduction according to the CD standard. Better results are obtained with k=0.02 to 0.05. The recording layer preferably has an index of refraction (the real part of a complex index of refraction) n of from 2.1 to 3.5, more preferably 2.2 to 3.0 at the wavelength of recording and reading light. With n<2.1, the differential reflectivity before and after recording would be reduced, often failing to allow reproduction according to the CD standard. Few dyes have n>3.5.

The light absorbing dyes used herein is preferably selected from cyanine dyes, phthalocyanine dyes, naphthalocyanine dyes, anthraquinone dyes, azo dyes, triphenylmethane dyes, pyrylium dyes, thiapyrylium dyes, and metal complex dyes alone or in admixture of two or more. Preferred cyanine dyes are cyanine dyes having an indolenine ring. Often the dye is used in admixture with a quencher. Alternatively, an ionic combination or ionically bonded compound of a dye cation and a quencher anion is a useful light absorbing dye. For this combination, the preferred dye is a cyanine dye having an indolenine ring and the preferred quencher is a metal complex dye such as bisphenyl dithiol metal complexes.

With regard to the dyes, quenchers and their combinations, reference is made to the following patent applications.

| Japanese Patent Application Kokai (JP-A) Nos. | | |
| --- | --- | --- |
| 24692/1984 | 55794/1984 | 55795/1984 |
| 81194/1984 | 83695/1984 | 18387/1985 |
| 19586/1985 | 19587/1985 | 35054/1985 |
| 36190/1985 | 36191/1985 | 44554/1985 |
| 44555/1985 | 44389/1985 | 44390/1985 |
| 47069/1985 | 20991/1985 | 71294/1985 |
| 54892/1985 | 71295/1985 | 71296/1985 |
| 73891/1985 | 73892/1985 | 73893/1985 |
| 83892/1985 | 85449/1985 | 92893/1985 |
| 159087/1985 | 162691/1985 | 203488/1985 |
| 201988/1985 | 234886/1985 | 234892/1985 |
| 16894/1986 | 11292/1986 | 11294/1986 |
| 16891/1986 | 08384/1986 | 14988/1986 |
| 163243/1986 | 210539/1986 | |
| Japanese Patent Application No. 54013/1985 | | |

Since some dyes can cause the groove bottom surface to be excessively deformed even when recording is done at a linear velocity of 3.6 m/s or higher, it is desired to choose adequate dyes which would not cause excessive deformation. The preferred dyes are photostabilized cyanine dyes of the following formula, that is, ionic combinations of a cyanine dye cation and a quencher anion.

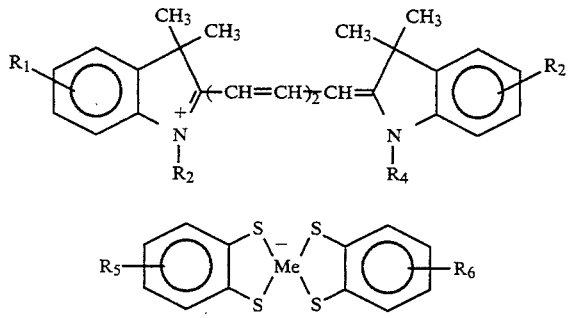

In the formula, $R_1$, $R_2$, $R_3$, and $R_4$ are independently selected from alkyl and phenyl groups, $R_5$ and $R_6$ are alkyl groups, and Me is Cu or Ni.

The dye used in the recording layer may be selected from the above-mentioned light absorbing dyes, dye-quencher mixtures, and bonded dye-quencher compounds as long as it has n and k in the above-defined ranges. If desired, a dye of a new design molecular structure may be synthesized.

The coefficient of extinction k of a dye with respect to recording and reading light generally varies over the range of from 0 to about 2 depending on its skeleton and substituent. In selecting a dye having a coefficient of extinction k of 0.01 to 0.10, for example, some limitations are imposed on its skeleton and substituent. Then the coating solvent is limited as the case may be. Some dyes cannot be applied to certain substrates. Further, determining a new molecular design requires an increased amount of labor for design and synthesis. Through experiments, the inventors found that a dye layer formed of a mixture of at least two dyes has a coefficient of extinction k which is determined from the coefficients of extinction k of the layers consisting of the respective dyes alone, in substantial proportion to the ratio of the dyes. Thus it is possible to form the recording layer from a compatible mixture of two or more dyes. Most mixtures of dyes have a coefficient of extinction k substantially proportional to the mixing ratio of dyes. More particularly, a mixture of i types of dye has a coefficient of extinction k substantially equal to $\Sigma C_i k_i$ wherein the i-th dye has a coefficient of extinction $k_i$ and a mixing fraction $C_i$. Thus a dye layer (or recording layer) having k=0.02 to 0.05 may be readily formed by mixing dyes having different k in a controlled mixing ratio. This, in turn, means that the dyes used herein can be selected from a wider variety.

The same principle as above can be applied to an improvement in wavelength dependency. In general, a semiconductor laser produces a beam having a wavelength width of ±10 nm. Commercial CD players require a reflectivity of at least 70% in the wavelength range between 770 nm and 790 nm. Generally, the coefficient of extinction k of a dye is largely dependent on a wavelength. Some dyes can have an adequate coefficient k at 780 nm, but a largely deviated coefficient k at 770 or 790 nm. In this case, two distinct dyes may be mixed to form a mixture which has adequate values of k and n over the wavelength range of 780±10 nm. This eliminates the limitation of film formation such as limitation of a coating solvent and allows for the use of a readily synthesizable, inexpensive dye, a dye having excellent properties, or a sparingly soluble dye. Where the recording layer is formed of a mixture of dyes, the dyes may be selected from those having an index of refraction n=1.9 to 6.5 and a coefficient of extinction k=0 to 2.

In determining n and k, a sample is prepared by forming a recording layer on a given transparent substrate to a thickness of about 400 to 800 Å. Then the reflectivity of the sample is measured through the substrate or from the recording layer side. Reflectivity is measured in a specular reflection mode (of the order of 5°) using light having the recording/reproducing wavelength. The transmittance of the sample is also measured. The index of refraction n and coefficient of extinction k may be calculated from these measurements according to Ishiguro Kozo, "Optics," Kyoritsu Publishing K.K., pages 168–178.

Although the recording layer can be formed by any desired method, coating is preferred because of an increased degree of freedom and ease in dye choice, medium design and manufacture. For coating of the recording layer, there may be used any of various solvents including ketone, ester, ether, aromatic, alkyl halide and alcohol solvents. A choice of the solvent also has a degree of freedom. Spin coating is a typical coating method.

Preferably, the recording layer thus formed has a thickness of about 1,500 to about 3,000 Å on average. Outside the range, the reflectivity would lower to render difficult reproduction according to the CD standard.

Reflective & Protective layers

Closely disposed on the recording layer 3 is the reflective layer 4. The reflective layer may be formed of a high reflectivity metal such as Au, Ag and Cu or an alloy containing at least one such element. Gold is most preferred. The reflective layer generally has a thickness of at least about 500 Å, preferably about 800 to about 1,500 Å and may be formed by evaporation or sputtering. With the reflective layer provided, the reflectivity of an unrecorded portion of an optical recording disk through the substrate can be at least 60%, especially at least 70%.

Closely disposed on the reflective layer 4 is the protective layer 5. The protective layer is preferably made of resins, for example, ultraviolet radiation cured resins and has a thickness of about 3 to about 100 μm. The protective layer may be a coated layer or a preformed sheet.

The present invention is not limited to the embodiment illustrated in FIG. 1. Another layer may be interposed between the recording layer and the reflective layer and sometimes between the substrate and the recording layer. One typical intermediate layer is a silicon dioxide layer of about 50 to 500 Å thick, often deposited by sputtering. Another exemplary intermediate layer is an organic film of polyolefin or the like having a thickness of about 100 to 500 Å. Such an organic film may be formed by spin coating a solution of organic polymer in an solvent which does not attack the recording layer, for example, hydrocarbon solvent.

The operation of the optical recording medium which is generally of the write-once type is described below. Signals are recorded or written and then reproduced or read in the optical recording medium 1 by irradiating pulses of writing/reading light to the recording layer 3 through the substrate 2 from the back surface side thereof. According to the present invention, recording is done at a relative linear velocity Vw of 3.6 m/s or higher between the writing light and the recording layer. On the other hand, reproduction is done at a relative linear velocity between the reading light and the recording layer which is generally equal to the standard reading linear velocity Vr of 1.2 to 1.4 m/s according to the CD standard. The present invention allows the relative linear velocity during reading to be increased beyond Vr, for example, to 2 to 4 times Vr whereby a higher data transfer speed is obtained. By increasing the relative linear velocity of the recording light during writing, the deformation of the groove bottom surface relative to the groove depth can be reduced. Despite the accelerated linear velocity on writing, in the spot where the recording light is irradiated, the dye is melted and partially decomposed. A mixture 6 of the dye and a decomposed product thereof forms in the irradiated spot as shown at the left side in FIG. 1, resulting in a lower index of refraction. The zone where the mixture 6 is present becomes a record mark having a reflectivity changed due to a phase difference. At this point, the groove bottom surface experiences less deformation. That is, the deformation of the groove bottom surface is small as compared with the groove depth, so that jitter is significantly reduced. According to the present invention, the deformation of the groove bottom surface is within ±18% of the groove depth. Sometimes the deformation of the groove bottom surface can be reduced to ±15% or less of the groove depth. In one embodiment wherein any interlayer is disposed between the substrate and the recording layer, the surface of the interlayer is also deformed at the same time when a record mark is formed upon exposure to the recording light, and the deformation of the interlayer surface is within 18% of the groove depth.

It is to be noted that the deformation of the groove bottom surface is measured in a direction perpendicular to the substrate surface with the original groove bottom surface set as a reference. Actually the deformation of the groove bottom surface is measured by first removing the protective and reflective layers from a disk sample. The exposed substrate surface is washed with an alcoholic solvent and then observed under a scanning tunneling microscope (STM) to examine the deformation of the groove bottom surface. As opposed to the optical recording medium of U.S. Pat. No. 5,161,150, in the case of a disk sample falling within the scope of the present invention, the decomposed dye product was not left at the groove bottom after mild washing of the substrate with the solvent by lightly shaking the substrate in the solvent.

Preferably the recording light has a peak power of at least 10 mW, more preferably 11 to 17 mW as measured in the recording layer. If the recording light has a lower power, the dye would be insufficiently decomposed so that the record mark might have a slight lowering of reflectivity. If the recording light power is too high, the groove bottom surface would sometimes be excessively deformed, with the advantages of the invention being lost. The optical pickup for recording usually has a numerical aperture (NA) of about 0.47 to about 0.55.

CD signals are EFM signals which are reproduced at the standard reproduction linear velocity Vr as a combination of pulses having a width nT wherein n is an integer of 3 to 11, i.e., equal to 3, 4, 5, 6, 7, 8, 9, 10 or 11 and T is equal to 231.4 ns. Since the present invention uses a recording linear velocity Vw which is higher than the standard reproduction linear velocity Vr, the signals for modulating the recording light have a pulse width which may be properly determined in accordance with the ratio of Vr and Vw. Preferably the recording light is modulated with an EFM signal having a pulse width represented by $(n+p)T \cdot Vr/Vw$ wherein n is an integer of 3 to 11, $-0.7 \leq p \leq +0.2$, T=231.4 ns, Vr is a standard compact disk reproduction linear velocity in the range of 1.2 to 1.4 m/s, and Vw is a relative linear velocity during writing of at least 3.6 m/s. With p outside the range, a DC component of jitter would increase. When Vw is 4.8 to 5.6 m/s, p is preferably set in the range: $-0.5 \leq p \leq +0.2$.

After record marks are formed in this way, reading light of 780 nm, for example, is irradiated thereto through the substrate. Due to optical phase difference at the record marks, the reflectivity is reduced by 60% or more as compared with the dye layer other than the record marks. The unrecorded portions maintain a high reflectivity of at least 60%, especially at least 70%. This enables reproduction according to the CD standard.

EXAMPLE

Examples of the present invention are given below by way of illustration and not by way of limitation.

Example 1

An optical recording disk sample as shown in FIG. 1 was prepared by starting with an annular polycarbonate resin substrate having an outer diameter of 120 mm, an inner diameter 15 mm and a thickness of 1.2 mm. The substrate had been provided with a continuous spiral groove having a width of 0.4 μm, a depth of 1,500 Å, and a pitch of 1.6 μm. A recording layer was formed on the substrate by spin coating a solution containing 7% by weight of a dye of the following formula in diacetone alcohol (DAA) solvent, followed by drying.

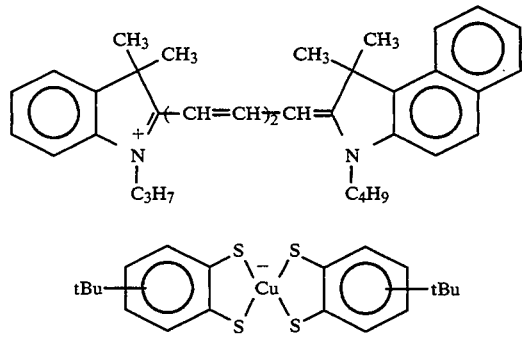

The recording layer was about 2,100 Å thick on average. The recording layer had a refractive index (n) of 2.3 and an extinction coefficient (k) of 0.03 with respect to light having a wavelength of 785 nm. It is to be noted that n and k were determined by applying a solution of the dye on a measurement substrate to form a test recording layer with a dry thickness of 600 Å and measuring the n and k of this test recording layer in accordance with Ishiguro Kozo, "Optics," Kyoritsu Publishing K. K., pages 168–178.

Next, gold was evaporated onto the recording layer to form a reflective layer of 1,000 Å thick. A UV-curable acrylic resin was coated thereon to a thickness of 10

μm and cured with UV to form a protective layer, completing the optical recording disk.

A test of recording and reproducing EFM signals was carried out on the optical recording disks. On writing, recording light of 785 nm in wavelength was condensed within the groove through an optical recording pickup having a numerical aperture (NA) of 0.5. The signals were reproduced by means of a conventional CD player for measuring a blocking error rate (BLER) and jitter. The linear velocity Vw of the recording light relative to the disk is shown in Table 1. The linear velocity of the reproducing light relative to the disk was equal to a standard reproduction linear velocity Vr of 1.2 or 1.4 m/s according to the CD standard. The peak power of the recording light in the recording layer was measured. The recording light was modulated by EFM signals having a pulse width (n+p)T·Vr/Vw wherein factor p was as reported in Table 1.

Figure 2A:
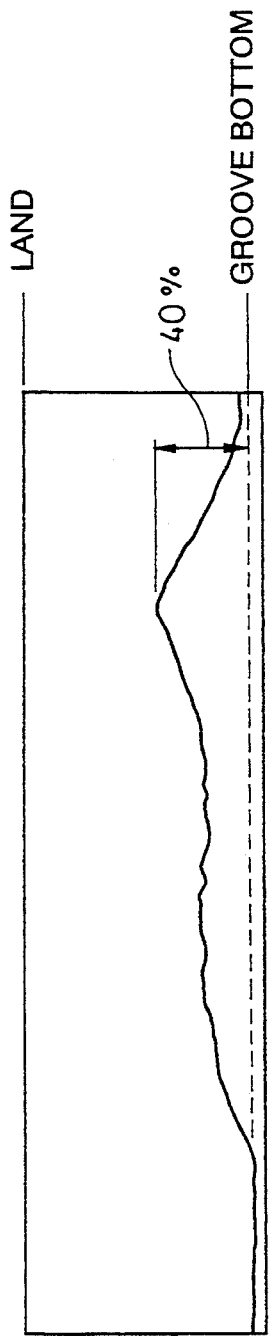
FIG. 2(a) and 2(b) are diagrams showing the topography of a groove bottom in the substrate of comparative and inventive optical recording disk samples from which the recording layer has been washed away, respectively.
Figure 2B:
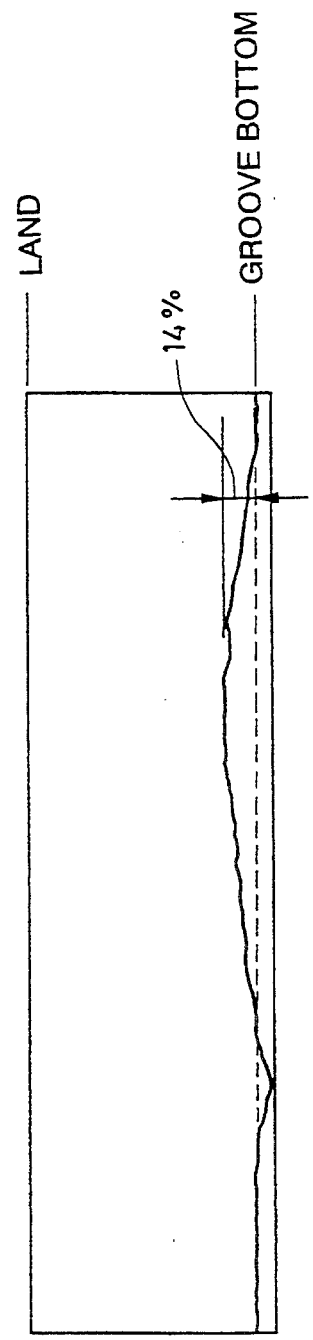

Next, the protective and reflective layers were removed from each of the optical recording disks and the recording layer was washed out with DAA solvent. After cleaning, a gold film of 100 Å thick was formed on the substrate surface by sputtering. Using a scanning tunneling microscope (STM), the topography of the groove bottom surface was imaged in a cross section along the center line thereof to draw a graph. From this graph, the deformation of the groove bottom surface in a 11T signal recorded spot was measured. The deformation of the groove bottom surface is a height of the groove bottom as measured in a direction perpendicular to the substrate surface with the groove bottom surface in the unrecorded region set as a reference. The deformation is expressed in percent based on the groove depth (100%). The topographic curve is illustrated in FIG. 2(a) for comparative disk No. 1-2 and FIG. 2(b) for inventive disk No. 1-8. The percent deformation is on the ordinate and a distance along the groove extending direction is on the abscissa.

TABLE I

| Disk No. | Linear velocity (m/s) Vw | Vr | Recording signal pulse factor p | Recording power (mW) | Jitter (ns) | BLER | Deformation (%) |
|---|---|---|---|---|---|---|---|
| 1-1* | 1.2 | 1.2 | −0.8 | 6.2 | 35 | $1 \times 10^{-2}$ | 43 |
| 1-2* | 1.4 | 1.4 | −0.8 | 6.5 | 30 | $5 \times 10^{-3}$ | 40 |
| 1-3* | 2.4 | 1.2 | −0.7 | 8.0 | 25 | $2 \times 10^{-3}$ | 22 |
| 1-4* | 2.8 | 1.4 | −0.7 | 8.5 | 22 | $1 \times 10^{-3}$ | 20 |
| 1-5 | 3.6 | 1.2 | −0.5 | 9.5 | 18 | $5 \times 10^{-4}$ | 15 |
| 1-6 | 4.2 | 1.4 | −0.5 | 11.0 | 16 | $5 \times 10^{-4}$ | 15 |
| 1-7 | 4.8 | 1.2 | −0.2 | 12.0 | 16 | $5 \times 10^{-4}$ | 15 |
| 1-8 | 5.6 | 1.4 | −0.2 | 13.0 | 16 | $5 \times 10^{-4}$ | 14 |
| 2-1 | 4.8 | 1.2 | −1.0 | 11.5 | 35 | $1 \times 10^{-2}$ | 15 |
| 2-2 | 4.8 | 1.2 | −0.5 | 11.0 | 28 | $2 \times 10^{-3}$ | 15 |
| 2-3 | 4.8 | 1.2 | −0.2 | 10.5 | 16 | $5 \times 10^{-4}$ | 14 |
| 2-4 | 4.8 | 1.2 | +0.1 | 10.0 | 30 | $5 \times 10^{-3}$ | 14 |
| 2-5 | 4.8 | 1.2 | +0.3 | 9.5 | 35 | $1 \times 10^{-2}$ | 13 |
| 2-6 | 5.6 | 1.4 | −1.0 | 13.0 | 30 | $6 \times 10^{-3}$ | 18 |
| 2-7 | 5.6 | 1.4 | −0.5 | 12.5 | 23 | $5 \times 10^{-4}$ | 15 |
| 2-8 | 5.6 | 1.4 | −0.2 | 12.0 | 16 | $5 \times 10^{-4}$ | 14 |
| 2-9 | 5.6 | 1.4 | +0.1 | 11.5 | 30 | $5 \times 10^{-3}$ | 13 |
| 2-10 | 5.6 | 1.4 | +0.3 | 11.0 | 33 | $8 \times 10^{-3}$ | 13 |

* outside the scope of the invention

As seen from Table 1 and FIG. 2, the invention has many advantages. More particularly, by writing signals at a relative linear velocity of 3.6 m/s or higher, the deformation of the groove bottom can be limited to less than 18% of the groove depth. Those disks having a less deformed groove bottom at record marks are capable of reproducing signals with low jitter and a low block error rate.

Japanese Patent Application No. 5-145660 is incorporated herein by reference as well as the above-cited patent publications.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A recording/reproducing method with an optical recording medium, comprising:

a polycarbonate resin substrate having a groove formed in one surface thereof, said groove having a bottom surface and a depth of 1,100 to 2,300 Å;

a recording layer disposed on a face surface of the substrate opposite said bottom surface and containing an organic dye, said recording layer having a thickness of 1500 to 3000 Å on average; and a reflective layer disposed on said recording layer; and said method comprising the steps of:

directing recording light to said recording layer within said groove from a backside of said substrate opposite said one surface and at a relative linear velocity Vw of at least 3.6 m/s;

modulating the recording light with an EFM signal having a pulse width represented by (n+p)T Vr/Vw, wherein n is an integer of 3 to 11, p is a recording signal pulse factor having a value of $-0.7 \leq p \leq +0.2$, where T=231.4 ns, Vr is a standard compact disk reproduction linear velocity in the range of 1.2 to 1.4 m/s;

forming a record mark in said recording layer as a result of partial decomposition of said organic dye while deforming the groove bottom surface, the deformation of the groove bottom surface being up to 18% of the groove depth.

2. The recording/reproducing method according to claim 1, wherein said optical recording medium further comprises an intermediate layer between said recording layer and said reflective layer.

3. The recording/reproducing method according to claim 1, wherein in said step of directing recording light, said recording light has a peak power of at least 10 mW as measured in said recording layer.

4. The recording/reproducing method of claim 1, wherein Vw is 4.8 to 5.6 m/s and $-0.5 \leq p \leq +0.2$.

* * * * *